UNITED STATES PATENT OFFICE 2,618,631

4-NITRO-2-TRIFLUOROMETHYL - BENZENE-AZO - N - HYDROXYETHYL - ANILINE DYE COMPOUNDS

Joseph B. Dickey, Rochester, N. Y., assignor to Eastman Kodak Company, Rochester, N. Y., a corporation of New Jersey No Drawing. Application May 27, 1949, Serial No. 95,874

6 Claims. (Cl. 260—207.5)

This invention relates to new azo compounds and their application to the art of dyeing or coloring.

I have discovered that the azo compounds having the formula:

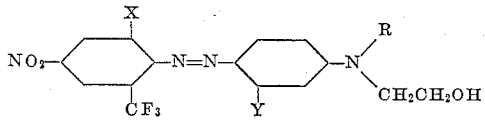

wherein X and Y each represents a chlorine atom or a bromine atom and R represents a methyl group, an ethyl group, a β-hydroxyethyl group, a β-hydroxypropyl group or a γ-hydroxypropyl group are valuable dyes for coloring textile materials made of or containing a cellulose alkyl carboxylic acid ester having two to four carbon atoms in the acid groups thereof. They are particularly of use for the coloration of cellulose acetate textile materials. They color the aforesaid textile materials brownish-orange shades from an aqueous suspension of the dye. The dyeings thus obtained possess good to excellent fastness to light and gas.

It is an object of my invention to provide new azo dye compounds. Another object is to provide a satisfactory process for the preparation of the new azo dye compounds of the invention. A further object is to provide dyed cellulose alkyl carboxylic acid ester textile materials which possess very good fastness to light and gas. A particular object is to provide new azo compounds which are especially of value for the dyeing of cellulose acetate textile materials.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose acetate-butyrate.

The new azo dye compounds of my invention are prepared by diazotizing 4-nitro-2-trifluoromethyl -6- chloroaniline or 4 - nitro -2- trifluoromethyl-6-bromoaniline and coupling the diazonium compound obtained with a compound having the formula:

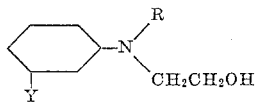

wherein R and Y have the meaning previously assigned to them.

The following examples illustrate the azo compounds of my invention and their manner of preparation:

EXAMPLE 1

A. *Preparation of nitrosyl sulfuric acid*

500 cc. of sulfuric acid (95–96%) were placed in a 5-liter flask fitted with a stirrer and thermometer and then 76 grams of commercial sodium nitrite (90–95% pure) were slowly added over a period of about one minute with vigorous stirring. The temperature of the reaction mixture rose to 70° C.–75° C. After the addition of the sodium nitrite the reaction mixture was stirred until a clear solution of nitrosyl sulfuric acid was obtained and then cooled to 12° C.–14° C. Then 1200 grams of glacial acetic acid were gradually added, keeping the temperature at first about 20° C. and then allowing it to fall to 15° C. at the end of the addition.

B. *Diazotization*

240.5 grams of 4-nitro-2-trifluoromethyl-6-chloroaniline were added portionwise, with stirring, to the nitrosyl sulfuric acid prepared as described above and simultaneously 1 kilogram of cold glacial acetic acid was added. The contents of the flask were stirred for two hours while keeping the temperature at about 15° C. A clear, yellowish diazonium solution is obtained, a drop of which is completely soluble in water.

C. *Coupling*

Concurrently with the preparation of the diazo solution, 215.5 grams of N-di-β-hydroxyethyl-m-chloroaniline were dissolved in 2000 grams of glacial acetic acid. Then 922 grams of anhydrous sodium carbonate were added to the acetic acid solution above described. The dough-like reaction mixture was stirred until no more foaming occurred and then cooled to 10° C.

The diazonium solution prepared as in B above was then poured onto 2500 grams of ice and the resulting solution was added to the reaction mixture containing the N-di-β-hydroxyethyl-m-chloroaniline with stirring. Coupling took place rapidly and the dye began to crystallize out at once. Coupling was complete in about 2–3 hours. Sufficient water was then added to the reaction mixture to completely precipitate the dye compound formed which was recovered by filtration, washed with water, and dried. The yield of dye melting at 130° C.–136° C. was 444 grams, which is 95% of the theory. The orange-colored dye after crystallization from acetic acid and water melted at 143° C.–145° C. The dye compound thus obtained has the formula:

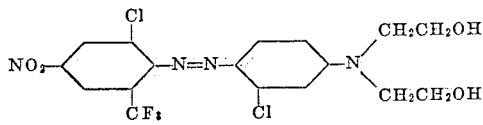

It colors cellulose acetate textile materials brownish-orange shades which have excellent fastness to light and gas.

EXAMPLE 2

27 grams of N-di-β-hydroxyethyl-m-bromoaniline are dissolved in 200 grams of glacial acetic acid. Then 92.2 grams of anhydrous sodium carbonate are added to the acetic acid solution just prepared. The dough-like reaction mixture is stirred until no more foaming occurs and then cooled to 10° C. The reaction mixture thus prepared is coupled with one tenth of a diazonium solution prepared as described in Example 1. The coupling reaction and recovery of the dye compound formed is carried out exactly as described in Example 1. The dye compound obtained has the formula:

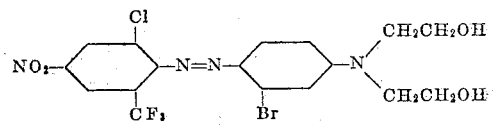

It colors cellulose acetate textile materials brownish-orange shades having excellent fastness to light and gas.

EXAMPLE 3

A. Diazotization 284.9 grams of 4-nitro-2-trifluoromethyl-6-bromoaniline are added portionwise, with stirring, to a nitrosyl sulfuric acid prepared exactly as described in A of Example 1 and simultaneously 1 kilogram of cold glacial acetic acid is added. The contents of the flask are stirred for two hours while keeping the temperature at about 15° C. A clear, yellowish diazonium solution is obtained, a drop of which is completely soluble in water.

B. Coupling 21.6 grams of N-di-β-hydroxyethyl-m-chloroaniline are dissolved in 200 grams of glacial acetic acid. Then 92.2 grams of anhydrous sodium carbonate are added to the acetic acid solution just prepared. The dough-like reaction mixture is stirred until no more foaming occurs and then cooled to 10° C. The reaction mixture thus prepared is coupled with one tenth of the diazonium solution prepared as described above. The coupling reaction and recovery of the dye compound formed is carried out exactly as described in Example 1. The dye compound obtained has the formula:

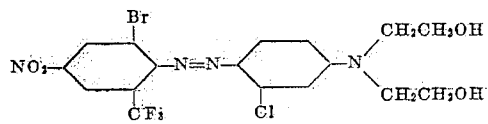

It colors cellulose acetate textile materials brownish-orange shades having excellent fastness to light and gas.

EXAMPLE 4

18.4 grams of N-methyl-N-β-hydroxyethyl-m-chloroaniline are treated with glacial acetic acid and anhydrous sodium carbonate in accordance with the procedure described in Examples 1, 2 or 3 and the reaction mixture thus prepared is coupled with one tenth of a diazonium solution prepared as described in Example 1. The coupling reaction and recovery of the dye compound formed is carried out exactly as described in Example 1. The dye compound obtained has the formula:

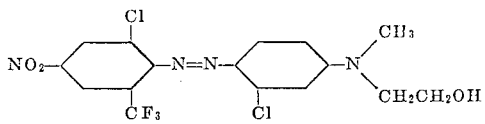

It colors cellulose acetate textile materials brownish-orange shades having excellent fastness to light and gas.

By the use of 22.9 grams of N-methyl N-β-hydroxyethyl-m-bromoaniline in place of N-methyl-N-β-hydroxyethyl-m-chloroaniline in the example just given, a dye compound is obtained which colors cellulose acetate textile materials brownish-orange shades having good fastness to light and gas.

EXAMPLE 5

19.8 grams of N-ethyl-N-β-hydroxyethyl-m-chloroaniline are treated with glacial acetic acid and anhydrous sodium carbonate in accordance with the procedure described in Examples 1, 2 or 3 and the reaction mixture thus prepared is coupled with one tenth of a diazonium solution prepared as described in Example 1. The coupling reaction and recovery of the dye compound formed is carried out exactly as described in Example 1. The dye compound obtained colors cellulose acetate textile materials brownish-orange shades having good fastness to light and gas.

By the use of 24.3 grams of N-ethyl-N-β-hydroxyethyl-m-bromoaniline in place of N-ethyl-N-β-hydroxyethyl-m-chloroaniline in the example just given, a dye compound is obtained which colors cellulose acetate textile materials brownish-orange shades having good fastness to light and gas.

EXAMPLE 6

28.7 grams of N-β-hydroxypropyl-N-β-hydroxyethyl-m-bromoaniline are treated with glacial acetic acid and anhydrous sodium carbonate in accordance with the procedure described in Examples 1, 2 or 3 and the reaction mixture thus prepared is coupled with one tenth of a diazonium solution prepared as described in Example 1. The coupling reaction and recovery of the dye compound formed is carried out exactly as described in Example 1. The dye compound obtained colors cellulose acetate textile materials brownish-orange shades having excellent fastness to light and gas.

By the use of 24.2 grams of N-β-hydroxypropyl-N-β-hydroxyethyl-m-chloroaniline in place of N-β-hydroxypropyl-N-β-hydroxyethyl-m-bromoaniline in the example just given, a dye compound is obtained which colors cellulose acetate textile materials brownish-orange shades having good fastness to light and gas.

EXAMPLE 7

24.2 grams of N-γ-hydroxypropyl-N-β-hydroxyethyl-m-chloroaniline are treated with glacial acetic acid and anhydrous sodium carbonate in accordance with the procedure described in Examples 1, 2 or 3, and the reaction mixture thus prepared is coupled with one tenth of a diazonium solution prepared as described in Example 1. The coupling reaction and recovery of the dye compound formed is carried out exactly as described in Example 1. The dye compound obtained colors cellulose acetate textile materials brownish-orange shades having excellent fastness to light and gas.

By the use of 28.7 grams of N-γ-hydroxypropyl-N-β-hydroxyethyl-m-bromoaniline in place of N-γ-hydroxypropyl-N-β-hydroxyethyl-m-chloroaniline in the example just given, a dye compound is obtained which colors cellulose acetate textile materials brownish-orange shades having good fastness to light and gas.

EXAMPLE 8

27 grams of N-di-β-hydroxyethyl-m-bromoaniline are treated with glacial acetic acid and anhydrous sodium carbonate in accordance with the procedure described in Examples 1, 2 or 3 and the reaction mixture thus prepared is coupled with one tenth of a diazonium solution prepared as described in part A of Example 3. The coupling reaction and recovery of the dye compound formed is carried out exactly as described in Example 1. The dye compound obtained colors cellulose acetate textile materials brownish-orange shades having excellent fastness to light and gas.

EXAMPLE 9

22.9 grams of N-methyl-N-β-hydroxyethyl-m-bromoaniline are treated with glacial acetic acid and anhydrous sodium carbonate in accordance with the procedure described in Example 1, 2 or 3 and the reaction mixture thus prepared is coupled with one tenth of a diazonium solution prepared as described in part A of Example 3. The coupling reaction and recovery of the dye compound formed is carried out exactly as described in Example 1. The dye compound obtained colors cellulose acetate textile materials brownish-orange shades having good fastness to light and gas.

By the use of 18.5 grams of N-methyl-N-β-hydroxyethyl-m-chloroaniline in place of N-methyl-N-β-hydroxyethyl-m-bromoaniline in the example just given, a dye compound is obtained which colors cellulose acetate textile materials brownish-orange shades having good fastness to light and gas.

EXAMPLE 10

19.8 grams of N-ethyl-N-β-hydroxyethyl-m-chloroaniline are treated with glacial acetic acid and anhydrous sodium carbonate in accordance with the procedure described in Examples 1, 2 or 3 and the reaction mixture thus prepared is coupled with one tenth of a diazonium solution prepared as described in part A of Example 3. The coupling reaction and recovery of the dye compound formed is carried out exactly as described in Example 1. The dye compound obtained colors cellulose acetate textile materials brownish-orange shades having food fastness to light and gas.

By the use of 24.3 grams of N-ethyl-N-β-hydroxy ethyl-m-bromoaniline in place of N-ethyl-N-β-hydroxyethyl-m-chloroaniline in the example just given, a dye compound is obtained which colors cellulose acetate textile materials brownish-orange shades having good fastness to light and gas.

EXAMPLE 11

28.7 grams of N-β-hydroxypropyl-N-β-hydroxyethyl-m-bromoaniline are treated with glacial acetic acid and anhydrous sodium carbonate in accordance with the procedure described in Examples 1, 2 or 3 and the reaction mixture thus prepared is coupled with one tenth of a diazonium solution prepared as described in part A of Example 3. The coupling reaction and recovery of the dye compound formed is carried out exactly as described in Example 1. The dye compound obtained colors cellulose acetate textile materials brownish-orange shades having good fastness to light and gas.

By the use of 24.2 grams of N-β-hydroxypropyl-N-β-hydroxyethyl-m-chloroaniline in place of N-β-hydroxypropyl-N-β-hydroxyethyl-m-bromoaniline in the example just given, a dye compound is obtained which colors cellulose acetate textile materials brownish-orange shades having good fastness to light and gas.

EXAMPLE 12

24.2 grams of N-γ-hydroxypropyl-N-β-hydroxyethyl-m-chloroaniline are treated with glacial acetic acid and anhydrous sodium carbonate in accordance with the procedure described in Examples 1, 2 or 3 and the reaction mixture thus prepared is coupled with one tenth of a diazonium solution prepared as described in part A of Example 3. The coupling reaction and recovery of the dye compound formed is carried out exactly as described in Example 1. The dye compound obtained colors cellulose acetate textile materials brownish-orange shades having good fastness to light and gas.

By the use of 28.7 grams of N-γ-hydroxypropyl-N-β-hydroxyethyl-m-bromoaniline in place of N-γ-hydroxypropyl-N-β-hydroxyethyl-m-chloroaniline in the example just given, a dye compound is obtained which colors cellulose acetate textile materials brownish-orange shades having good fastness to light and gas.

In order that the preparation of the azo compounds of my invention may be clearly understood, the preparation of certain intermediates used in their manufacture is described hereinafter.

EXAMPLE A

*4-nitro-2-trifluoromethyl-6-chloroaniline*

990 grams of concentrated hydrochloric acid and 500 grams of glacial acetic acid were placed in a 2-liter flask equipped with a chlorine inlet tube, a gas escape tube attached to a water tap, a mechanical stirrer, a thermometer and a cooling bath. Then 206 grams of finely powdered 4-nitro-2-trifluoromethylaniline were added to the mixed acids. The reaction mixture was cooled to 10° C. and about 73 grams of chlorine were gradually introduced with vigorous stirring over a period of 4 to 6 hours while keeping the temperature between 10° C.–15° C. The reaction proceeded rapidly without much evolution of heat and 4-nitro-2-trifluoromethyl-6-chloroaniline separated as a fine yellow solid. Toward the end of the chlorination, the rate of addition of chlorine was materially lowered to avoid decomposition of the 4-nitro-2-trifluoromethyl-6-chloroaniline.

When about 73 grams of chlorine (or until a sample gives the desired melting point) had been absorbed, the chlorine addition was stopped and the reaction mixture stirred for one hour to complete the reaction. The reaction mixture was then filtered on a Buchner funnel to recover the precipitated 4-nitro-2-trifluoromethyl-6-chloroaniline. The filter cake was washed with 100 grams of acetic acid and then with 175 grams of water.

After drying the compound melted at 112° C.–114° C. and after crystallization from acetic acid it melted at 115° C.–116° C. The yield of 4-nitro-2-trifluoromethyl-6-chloroaniline was 228 grams which is 95% of the theoretical.

EXAMPLE B

*4-nitro-2-trifluoromethyl-6-bromoaniline*

20.6 grams of 4-nitro-2-trifluoromethylaniline were dissolved in 100 ccs. of acetic acid and 16.8 grams of bromine in 100 ccs. of acetic acid were gradually added at 40° C. The reaction mixture was placed on a steam bath for 4 hours under a condenser. Then it was cooled and poured into ice water. 4-nitro-2-trifluoromethyl-6-bromoaniline precipitated as a yellow solid and was recovered by filtration. The filter cake was washed with a water solution of NaHSO₃, then with water and dried. It melted at 140° C.–142° C. The yield was 26 grams.

EXAMPLE C

*N-di-β-hydroxyethyl-m-chloroaniline*

127.5 grams of m-chloroaniline were placed in a shaking autoclave cooled to 10° C. together with 101.2 grams of ethylene oxide. The autoclave was slowly heated to 180° C. and heating was continued with shaking at 185° C.–190° C. for 12 hours.

The autoclave was then cooled to about 90° C. and the N-di-β-hydroxyethylaniline reaction product was removed. The straw-colored reaction product solidifies when cold. Upon crystallization from chloroform, it melted at 88°C.–92° C. and boiled at 208° C.–213° C./4 mm. while N-β-hydroxyethyl-m-chloroaniline boils at 165° C.–170° C./2 mm.

EXAMPLE D

*N-di-β-hydroxyethyl-m-bromoaniline*

This compound is prepared by reacting 172 grams of m-bromoaniline with 101.2 grams of ethylene oxide in accordance with the procedure described in Example C. It melts at 103° C.–106° C.

EXAMPLE E

*N-ethyl-N-β-hydroxyethyl-m-chloroaniline*

74 grams of ethyl iodide were added dropwise to a mechanically stirred mixture of 67 grams of N-β-hydroxyethyl-m-chloroaniline and 39 grams of sodium bicarbonate at reflux temperature. Following the addition of the ethyl iodide, the reaction mixture was heated at reflux temperature for 8 hours and allowed to stand overnight. The reaction mixture was filtered to remove salt and any other insoluble material and the filtrate was vacuum distilled to obtain 32 grams of N-ethyl-N-β-hydroxyethyl-m-chloroaniline boiling at 107° C.–112° C./1–2 mm.

EXAMPLE F

*N-β-hydroxyethyl-N-β-hydroxypropyl-m-chloroaniline*

18.5 grams of β-hydroxypropyl-m-chloroaniline, 5.2 grams of ethylene oxide and 10 cc. of ethyl alcohol were heated 8 hours at 185° C. with shaking in a sealed glass tube. Upon distillation of the reaction mixture under reduced pressure, 18 grams of N-β-hydroxyethyl-N-β-hydroxypropyl-m-chloroaniline boiling at 170° C.–175° C./5 mm. were obtained.

EXAMPLE G

*N-methyl-N-β-hydroxyethyl-m-chloroaniline*

14 grams of N-methyl-m-chloroaniline and 4.6 grams of ethylene oxide were heated in a sealed glass tube at 180° C.–195° C. for 10 hours. The reaction mixture was then cooled, removed from the tube and distilled under reduced pressure. A good yield of N-methyl-N-β-hydroxyethyl-m-chloroaniline boiling at 150° C.–154° C./4 mm. was obtained as a colorless oily liquid.

EXAMPLE H

*N-methyl-m-chloroaniline*

12.8 grams of m-chloroaniline, 8 grams of sodium hydroxide, 80 cc. of water and 17.7 grams of benzenesulfonylchloride were heated on a steam bath for two hours with stirring. Then 17 grams of methyl iodide were added dropwise with stirring and the reaction mixture was heated overnight with stirring. The sulfonamide compound formed by the foregoing reaction was separated from the reaction mixture and digested on a steam bath with 100 cc. of 70% sulfuric acid for six hours. The resulting reaction mixture was cooled, made just basic with sodium hydroxide, and steam distilled. The oil was extracted from the distillate with ether and the ether extract was distilled to obtain N-methyl-m-chloroaniline which boils at 235° C.–236° C.

EXAMPLE I

*N-methyl-N-β-hydroxyethyl-m-bromoaniline*

20 grams of N-methyl-m-bromoaniline and 5 grams of ethylene oxide were heated in a sealed glass tube at 185° C.–195° C. for 10 hours. The reaction mixture was then cooled, removed from the tube and distilled under reduced pressure. A good yield of N-methyl-N-β-hydroxyethyl-m-bromoaniline boiling at 165° C.–170° C./5 mm. was obtained as a colorless oily liquid.

EXAMPLE J

*N-ethyl-m-bromoaniline*

17.2 grams of m-bromoaniline, 8 grams of sodium hydroxide, 80 cc. of water and 17.7 grams of benzenesulfonyl chloride were heated on a steam bath for two hours with stirring. Then 20 grams of ethyl iodide were added dropwise with stirring and the reaction mixture was heated overnight with stirring. The sulfonamide compound formed by the foregoing reaction was separated from the reaction mixture and digested on a steam bath with 100 cc. of 70% sulfuric acid for six hours. The resulting reaction mixture was cooled, made just basic with sodium hydroxide, and steam distilled. The distillate was extracted with dry benzene and the benzene extract was distilled to obtain N-ethyl-m-bromoaniline which boils at 124° C.–127° C./5 mm.

EXAMPLE K

*N-ethyl-N-β-hydroxyethyl-m-bromoaniline*

20 grams of N-ethyl-m-bromoaniline and 5 grams of ethylene oxide were heated in a sealed tube at 190° C.–200° C. for eight hours. The reaction mixture was then cooled, removed from the tube and distilled under reduced pressure. A good yield of N-ethyl-N-β-hydroxyethyl-m-bromoaniline boiling at 175° C.–180° C./4 mm. was obtained as a practically colorless oily liquid.

EXAMPLE L

*N-γ-hydroxypropyl-m-chloroaniline*

269 grams of trimethylenechlorohydrin, 336 grams of m-chloroaniline and 290 grams of NaHCO₃ were placed in a 1-liter 3-necked flask equipped with a thermometer, a mechanical stirrer and a reflux condenser and the reaction mixture was heated at reflux temperature with stirring for eight hours. Then the reaction mixture was cooled, the reaction product was taken up in ethyl ether and filtered. The ether solution was washed with water and dried and the ether removed by distillation. The residue was distilled under a reduced pressure of about 2.5 mm. from a modified Claisen column yielding a forerun and 217 grams (42%) of N-γ-hydroxypropyl-m-chloroaniline boiling at 158° C.–162° C./2.5 mm. It is a practically colorless viscous liquid. 67.8 grams of N-di-(γ-hydroxypropyl)-m-chloroaniline boiling at 205° C.–210° C./2.5 mm. were also obtained.

EXAMPLE M

*N-β-hydroxyethyl-N-γ-hydroxypropyl-m-chloroaniline*

92 grams of N-γ-hydroxypropyl-m-chloroaniline in 200 cc. of ethyl alcohol were reacted with 26.4 grams of ethylene oxide in a shaking autoclave at 175° C.–180° C. for nine hours. The alcohol was distilled off and the residue fractionated under a reduced pressure of about 1.5 mm. 76 grams of N-β-hydroxyethyl-N-β-hydroxypropyl-m-chloroaniline boiling at 194° C.–196° C./1.5 mm. were obtained. The product is a viscous, pale straw-colored oil.

EXAMPLE N

*N-β-hydroxyethyl-N-β-hydroxypropyl-m-bromoaniline*

108 grams of N-β-hydroxyethyl-m-bromoaniline in 200 cc. of ethyl alcohol were reacted with 35 grams of propylene oxide

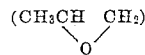

in a shaking autoclave at 185° C.–190° C. for nine hours. The alcohol was removed by distillation and the residue fractionated under a reduced pressure of about 1 mm. N-β-hydroxyethyl-N-β-hydroxypropyl-m-bromoaniline boiling at 230° C.–235° C./1 mm. was obtained. The product is a practically colorless viscous liquid.

EXAMPLE O

*N-β-hydroxyethyl-N-γ-hydroxypropyl-m-bromoaniline*

115 grams of N-γ-hydroxypropyl-m-bromoaniline in 200 cc. of ethyl alcohol were reacted with 26.4 grams of ethylene oxide in a shaking autoclave at 175° C.–180° C. for nine hours. The alcohol was distilled off and the residue fractionated under a reduced pressure of about 1.5 mm. About 85 grams of N-β-hydroxyethyl-N-γ-hydroxypropyl-m-bromoaniline boiling at 240° C.–245° C./1 mm. were obtained. The product is a practically colorless viscous liquid.

EXAMPLE P

*N-β-hydroxyethyl-m-bromoaniline*

17 grams of m-bromoaniline and 5 grams of ethylene oxide were heated in a sealed tube at 185° C.–195° C. for 10 hours. The reaction mixture was then cooled, removed from the tube and fractionated under reduced pressure to give a good yield of N-β-hydroxyethyl-m-bromoaniline boiling at 170° C.–175° C./2 mm. The product is a practically colorless heavy viscous liquid.

EXAMPLE Q

*N-γ-hydroxypropyl-m-bromoaniline*

269 grams of trimethylenechlorohydrin, 590 grams of m-bromoaniline and 290 grams of sodium bicarbonate were heated together at refluxing temperature with stirring for 8 hours. The reaction mixture was then cooled, extracted with methyl alcohol and the alcohol extract was fractionated under reduced pressure. γ-hydroxypropyl-m-bromoaniline boiling at 175° C.–180° C./2.8 mm. was obtained. It is a practically colorless heavy viscous liquid. Some bis-γ-hydroxypropyl-m-bromoaniline boiling at 235° C.–240° C./3 mm. was also obtained.

The term "acetic acid" as used herein refers to glacial acetic acid or acetic acid of substantially this strength. The concentrated hydrochloric acid referred to herein is aqueous hydrochloric acid having a specific gravity of about 1.14.

The azo dye compounds of my invention can be applied to the textile materials indicated hereinbefore in the form of an aqueous dispersion and are ordinarily so applied. To illustrate, the dye compound is finely ground with a dispersing agent such as Turkey red oil, sulfite cellulose solution, soap, or an oleyl glyceryl sulfate and the resulting paste is dispersed in water. The dye bath thus prepared is heated to a temperature approximating 45° C.–55° C. and the textile material to be dyed is immersed in the dyebath, following which the temperature is gradually raised to 80° C.–90° C. and maintained at this point until dyeing is complete, usually one half hour to two hours. Upon completion of the dyeing operation the textile material is removed from the dyebath, washed with soap, rinsed well with water and dried.

Widely varying amounts of the dye can be used in the dyeing operation. The amount of dye used can be, for example, ⅓ to 3% (by weight) of that of the textile material although lesser or greater amounts of dye can be employed.

I claim:

1. The azo dye compounds having the general formula:

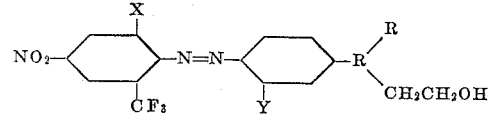

wherein X and Y each represents a member selected from the group consisting of a chlorine atom and a bromine atom and R represents a member selected from the group consisting of a methyl group, an ethyl group, a β-hydroxyethyl group, a β-hydroxypropyl group and a γ-hydroxypropyl group.

2. The azo dye compound having the formula:

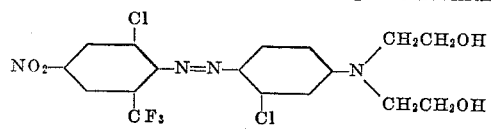

3. The azo dye compound having the formula:

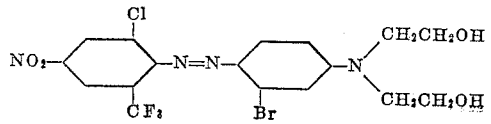

4. The azo dye compound having the formula:

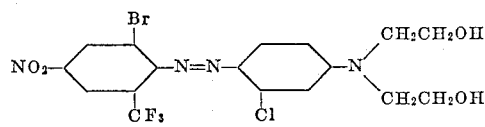

5. The azo dye compound having the formula:

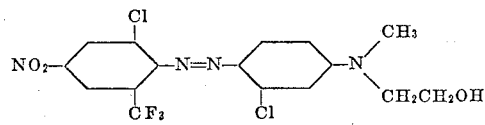

6. The azo dye compound having the formula:

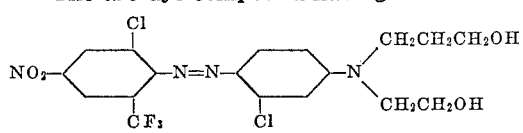

JOSEPH B. DICKEY.

REFERENCES CITED

The following references are of record in the file of this patent:

UNITED STATES PATENTS

| Number | Name | Date |
|---|---|---|
| 1,673,301 | Reddelien et al. | June 12, 1928 |
| 2,064,332 | Zwilgmeyer | Dec. 15, 1936 |
| 2,081,244 | Matzdorf et al. | May 25, 1937 |
| 2,115,412 | Dahlen | Apr. 26, 1938 |
| 2,118,661 | Baumann et al. | May 24, 1938 |
| 2,153,018 | Heyna | Apr. 4, 1939 |
| 2,194,927 | Daudt | Mar. 26, 1940 |
| 2,222,775 | Kunze | Nov. 26, 1940 |
| 2,241,449 | Ellis et al | May 13, 1941 |
| 2,317,365 | Dickey et al. | Apr. 27, 1943 |